United States Patent
Lashina et al.

(10) Patent No.: US 9,606,621 B2
(45) Date of Patent: Mar. 28, 2017

(54) GAZE INTERACTION FOR INFORMATION DISPLAY OF GAZED ITEMS

(75) Inventors: Tatiana Aleksandrovna Lashina, Eindhoven (NL); Kero Van Gelder, Eindhoven (NL); Sander Bernard Francis Van De Wijdeven, Eindhoven (NL); Gerrit Hollemans, Eindhoven (NL); Vincentius Paulus Buil, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 1242 days.

(21) Appl. No.: 12/373,829

(22) PCT Filed: Jul. 10, 2007

(86) PCT No.: PCT/IB2007/052737
§ 371 (c)(1),
(2), (4) Date: Jan. 14, 2009

(87) PCT Pub. No.: WO2008/012717
PCT Pub. Date: Jan. 31, 2008

(65) Prior Publication Data
US 2010/0007601 A1 Jan. 14, 2010

(30) Foreign Application Priority Data
Jul. 28, 2006 (EP) .................................. 06118029

(51) Int. Cl.
*G09G 5/00* (2006.01)
*G06F 3/01* (2006.01)
(52) U.S. Cl.
CPC .................................. *G06F 3/013* (2013.01)

(58) Field of Classification Search
USPC ................. 345/156; 707/723–735; 715/700
See application file for complete search history.

(56) References Cited

U.S. PATENT DOCUMENTS 5,204,947 A * 4/1993 Bernstein et al. ............ 715/854
5,574,669 A * 11/1996 Marshall ........................ 702/149
(Continued)

FOREIGN PATENT DOCUMENTS

EP 1213642 A1 6/2002
GB 2367991 A 4/2002
(Continued)

OTHER PUBLICATIONS

C. Morimoto et al; "Real-Time Detection If Eyes and Faces", Proc. Wkshp. Percept. User Interfaces, pp. 117-120, 1998.
(Continued)

*Primary Examiner* — Towfiq Elahi (57) ABSTRACT

An interactive method and system include at least one detector (210) configured to detect glazes of at least one viewer (250) looking at items (230, 232, 234). A processor (130) is configured to calculate gaze durations, such as cumulative gaze durations per item of the items, identify the most looked at item(s) in accordance with the cumulative gaze durations, and provide information related to the most looked at items. A display device (240) displays the information, a list of the most looked at items, representations of the most looked at items, and/or audio/visual show related to at least one item of the most looked at items. At least one item (290) and/or item representation may be displayed more prominently than others ones of the most looked at items and/or item representations.

13 Claims, 3 Drawing Sheets

(56) References Cited

U.S. PATENT DOCUMENTS

| | | | |
|---|---|---|---|
| 5,689,619 A * | 11/1997 | Smyth | 706/45 |
| 6,353,773 B1 * | 3/2002 | Takenaka | 700/245 |
| 6,359,601 B1 | 3/2002 | Maguire, Jr. | |
| 6,408,282 B1 * | 6/2002 | Buist | 705/36 R |
| 6,456,262 B1 * | 9/2002 | Bell | 345/8 |
| 7,029,121 B2 | 4/2006 | Edwards | |
| 7,120,880 B1 * | 10/2006 | Dryer et al. | 715/863 |
| 2003/0057887 A1 | 3/2003 | Dowling et al. | |
| 2003/0192050 A1 * | 10/2003 | Fellenstein et al. | 725/53 |
| 2004/0196433 A1 | 10/2004 | Durnell | |
| 2006/0004685 A1 * | 1/2006 | Pyhalammi et al. | 707/1 |
| 2006/0020973 A1 * | 1/2006 | Hannum et al. | 725/46 |
| 2006/0047649 A1 * | 3/2006 | Liang | 707/4 |
| 2006/0082542 A1 * | 4/2006 | Morita et al. | 345/156 |

FOREIGN PATENT DOCUMENTS

| | | |
|---|---|---|
| WO | 9636955 | 11/1996 |
| WO | 2003050658 A2 | 6/2003 |
| WO | 2005022887 A2 | 3/2005 |
| WO | 2007015200 A2 | 2/2007 |
| WO | 2007138504 A2 | 12/2007 |

OTHER PUBLICATIONS

M. Mc Guffin et al; "Acquisition of Expanding Targets", Proc. CHI 2002, ACM, pp. 57-64.

* cited by examiner

GAZE INTERACTION FOR INFORMATION DISPLAY OF GAZED ITEMS

This application is a national stage application under 35 U.S.C. §371 of International Application No. PCT/IB2007/052737 filed on Jul. 10, 2007, and published in the English language on Jan. 31, 2008, as International Publication No. WO/2008/012717, which claims priority to European Application No. 06118029.5, filed on Jul. 28, 2006, incorporated herein by reference.

The present invention relates to an interaction solution for providing system feedback and product information as result of detecting gaze of a user looking at the product(s) within a field of view, such as within the interactive shop window, for example, based on analyzing the gaze, and showing information about the most looked at product(s) for example.

For entertaining customers and for the sake of providing extra information about products, retailers already deploy various display technologies ranging from large liquid crystal display (LCD) or plasma displays to transparent projection screens. These displays are often found installed in shop windows where they are used to display video clips, a slide show with announcements or information about the shop or their products. Most of the currently used shop window displays are pure informative non-interactive screens. More advanced shop window displays offer some interactivity with the display device on a basic level, where a user can press a button on or near the display device to activate some functionality, such as go to the next or previous page.

A more attractive shop window may be realized by combining physical products exhibited behind the shop window and a shop window display that would show information about the product(s) the user is interested in. Such a shop window display system may infer the interest of the user either using gaze tracking or pointing gestures detection, as described in European Patent Application Serial Number 05107205.6, filed Aug. 4, 2005, entitled "Apparatus for Monitoring a Person Having an Interest to an Object, and Method Thereof" which is incorporated herein by reference in its entirety. In such an interactive shop window, the user may look or point at a physical product. The looking/gazing and/or pointing is detected by the shop window, in response to which the shop window displays information about the product on the display. Such a shop window is advantageous since it enables the viewer(s) to both actually see the real physical product and at the same time get additional (e.g., digital) information, including various interactive services provided/suggested on the display device.

In addition to detecting the gaze of a single viewer, multiple gazes and faces may also be detected. Gaze tracking of multiple users simultaneously using one gaze tracker may be based on grouping the detected pupil candidates into a 'face pair' using heuristic rules, as described in an article entitled "Real-Time Detection of Eyes and Faces," by C. Morimoto, D. Koons, A. Amir, and M. Flickner, in Proc. Wkshp. Percept. User Interfaces, pages 117-120, 1998, which is incorporated herein by reference in its entirety. Further eye tracking systems that aggregate eye tracking data of multiple users to determine trends, for example, used by webpage designers or advertisers, is described in U.S. Pat. No. 7,029,121 to Edwards, entitled "Techniques for Facilitating Use of Eye Tracking Data" which is incorporated herein by reference in its entirety. In such a system, aggregation may be accomplished by summing or averaging data, as well as using division and statistical analysis.

The inventors have realized that there are certain situations that are not well addressed, for example, for a set-up of a shop window in which the selection of a product is made with gaze. In particular, it is desirable to provide an interaction system and method that better react to gaze tracking input from viewer(s), and to better react to situations where more than one user or viewer is interacting with the shop window, or any other display of objects within the field of view of one or more viewers, such as artwork in a museum and the like. One of the straightforward methods for a shop window scenario or similar scenarios, for example, is to show the product last looked at on a display device, including the shop window display where images are displayed or projected thereon. However, this solution is not ideal since gaze is not a suitable modality to explicitly select things.

To illustrate, imagine that a user is in front of the shop window (or any other arrangement of physical products, such as artwork in a museum and the like), and glances at different products just to get an overview of what is displayed. In response, an interaction system reacts to the viewer's gaze and shows the products last looked at on the shop window display, or any other display device. When the user/viewer sees the link between his gaze and the system reaction, the user he will need to stare at a product of his interest in order to get additional information about that product on the display device. Such a way of selection, namely, to continue staring to get additional information, is unnatural.

Further, such systems do not react well in the case of multiple viewers looking/gazing or pointing to a product. That is, to which user's gaze the system should react in case of multiple users or how should the system react to multiple users gaze? A similar problem occurs in case of using a pointing gesture for selection when multiple people simultaneously point at several different products.

Accordingly there is a need for a better interactive system for providing better product selection and information based on a single or multiple viewers gazing or pointing to one or multiple products.

One object of the present systems and methods is to overcome the disadvantage of conventional interactive systems.

This and other objects are achieved by systems and methods that treat gaze duration as an indication of the user's interest, which is then used to identify and highlight product(s) most relevant for that user, including displaying product representations, such as icons and/or thumbnails on a display device along with information related to the identified products, such as a slide show, video clips and links to access additional information such as product specification and related products, for example.

According to one illustrative embodiment, an interactive method and system comprises a detector configured to detect gazes of at least one viewer looking at items; and a processor configured to calculate gaze durations, such as cumulative gaze durations per item of the items, identify the most looked at items in accordance with the cumulative gaze durations, and provide information related to the most looked at items. A display device may be provided for displaying at least one of the information, a list of the most looked at items, representations of the most looked at items, and at least one of audio and visual show related to at least one item of the most looked at items. At least one item and/or item representation may be displayed more prominently than others ones of the most looked at items and/or item representations.

The systems and methods are better suited for using gaze interaction that works both for single and multiple users. Duration of gazing or gaze times within a predefined timeframe for all products per each user/viewer are detected, and the most looked at products are identified for all users and/or for each individual user. The gaze time(s) related to each product per each user is detected and analyzed, where average and/or cumulative gaze times associated with each or any number of the products and/or users are calculated and ranked. The products are ranked in accordance with the gaze times and the most relevant one or ones of the ranked products are identified.

Using the most-looked at products as an indication of the most interesting to the viewer or user of the interactive gaze system, different strategies are used for system reaction. One strategy includes identifying the most looked at product(s) and then show them on a display device, such as the shop window display, enlarge their corresponding thumbnails and/or icons, and/or start a slide show related to one or more of these most looked products. Slide shows and/or video clips related to one or more than the most looked at products may be shown simultaneously in tiled thumbnails showing reduced-size version of the product images when related slide shows and/or video clips are not being shown.

Another strategy includes showing thumbnails of products sorted according to their average gaze time corresponding to every user, which may be in combination with the most looked at product displayed prominently and/or in a desired section of the display device, such as at the center of the display device.

Further areas of applicability of the present systems and methods will become apparent from the detailed description provided hereinafter. It should be understood that the detailed description and specific examples, while indicating exemplary embodiments of the systems and methods, are intended for purposes of illustration only and are not intended to limit the scope of the invention.

These and other features, aspects, and advantages of the apparatus, systems and methods of the present invention will become better understood from the following description, appended claims, and accompanying drawing where:

The following description of certain exemplary embodiment(s) is merely exemplary in nature and is in no way intended to limit the invention, its application, or uses. In the following detailed description of embodiments of the present systems and methods, reference is made to the accompanying drawings which form a part hereof, and in which are shown by way of illustration specific embodiments in which the described systems and methods may be practiced. These embodiments are described in sufficient detail to enable those skilled in the art to practice the presently disclosed system and it is to be understood that other embodiments may be utilized and that structural and logical changes may be made without departing from the spirit and scope of the present system.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of well-known devices, circuits, and methods are omitted so as not to obscure the description of the present system.

Gaze is a natural modality that indicates user's interest. However, it is desirable not to rely on gaze as a way of explicit input, such as for selection of a gazed object, since people find it awkward to stare at objects in order to select them.

Figure 1:
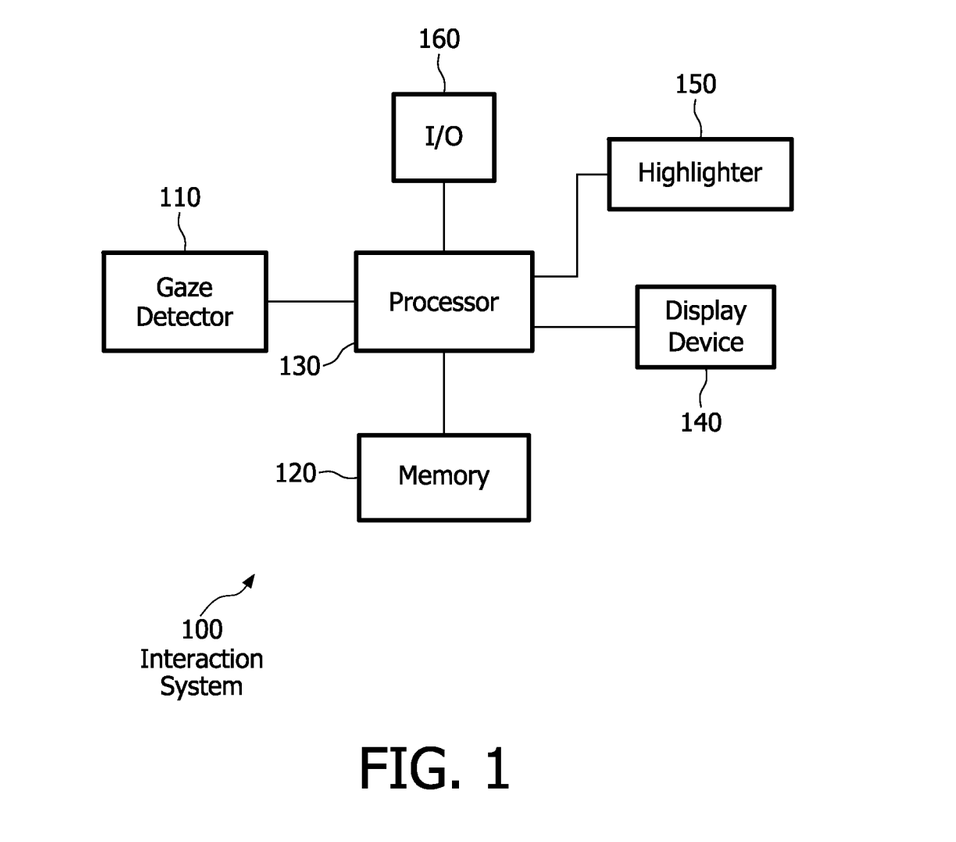
FIG. 1 shows a block diagram of an interactive system according to one illustrative embodiment of the present invention.

FIG. 1 shows a better interaction system 100 based on detecting gaze using a gaze detector such as at least one camera 110, inferring or determining from the gaze the focus of user's attention and based on a predetermined map of various products within the field of view of the system user or viewer of the products, determine the products looked at, such as via a processor or controller 130. The predetermined map may be stored in any storage device or memory 120 capable of storing the map and other data.

The processor 130 is further configured to perform desired acts, such as upon execution of instructions based on a program stored in the memory 120, for example, which also stores other data for system operation, such as an operating system and the like.

Based on the inference or determination of products looked at by one or more viewers and respective gaze durations, including cumulative and/or average gaze durations per user per product, various acts may be performed under the control of processor 130, comprising monitoring and collecting data including gaze durations per product and/or per user, analyzing the data including calculating average and/or cumulative gaze durations per product and/or per user, and based on the analyzed and/or calculated data, providing desired outputs, such as displaying information including links to further information on a display device 140, and/or highlighting via a highlighter 150 the physical product(s) identified and ranked as the most interesting product(s) to each or a group of users. The display device 140 may be a shop window display 240, for example, as shown in the shop interactive system 200 of FIG. 2.

Figure 2:
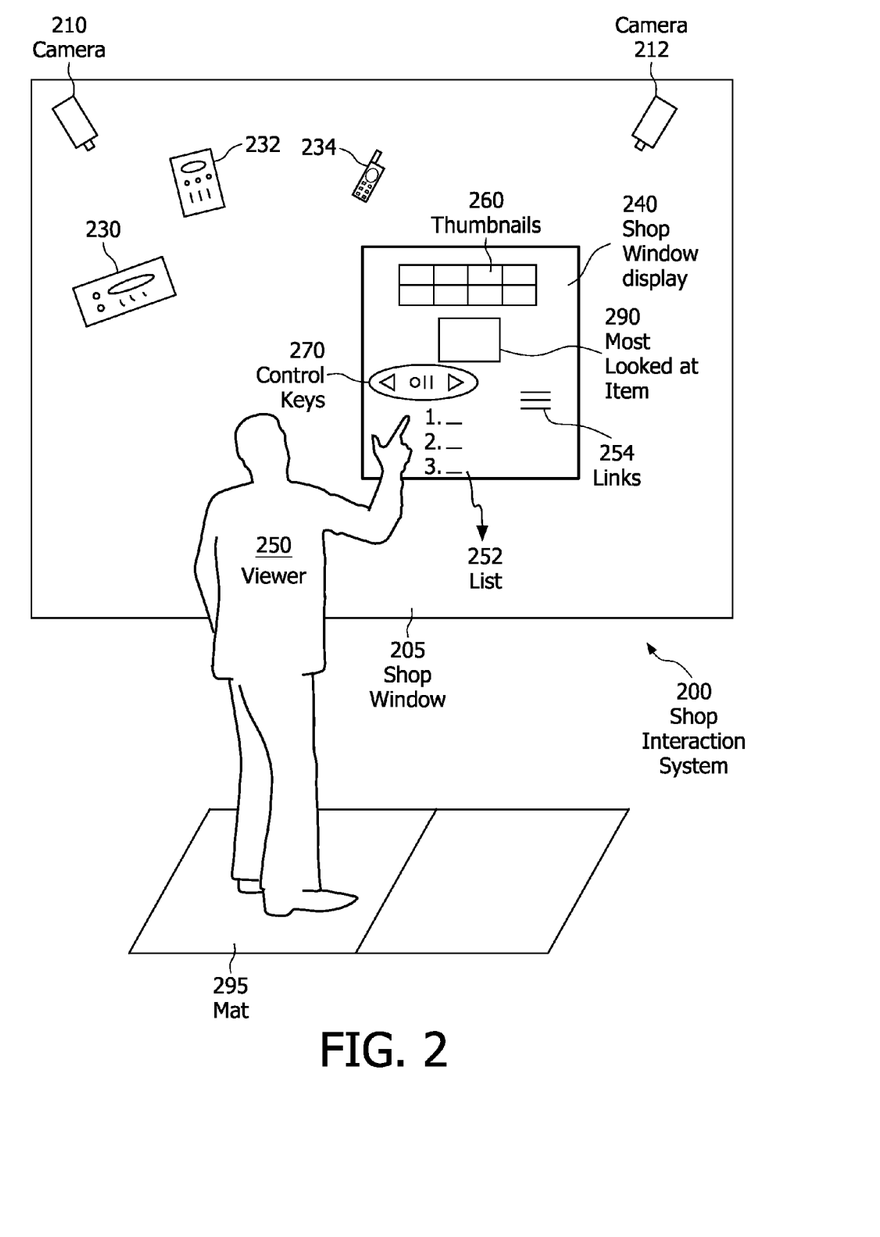
FIG. 2 shows a shop interactive system according to another illustrative embodiment of the present invention.

FIG. 2 further shows a shop window 205 that includes various products 230, 232, 234 and at least one camera, where two camera 210, 212 are shown that form part of the gaze detector 110 shown in FIG. 1. The shop window display 240 may be embedded in the transparent shop window 205, for example, or may be a separate display inside the shop window 205 or on it, either on the exterior or interior surface of the shop window 205. For example, rear or front projection displays that project onto a transparent screen, such as the transparent shop window 205, may be used, such as the Holo Screen™ available from DNP of Denmark, the worldwide screen production centre of Dai Nippon Print Co. Ltd. Other transparent material that have display capability are available from Displax™—Interactive Window where content is projected on the transparent material, such as glass, and controlled by touching the glass where the user's finger is tracked. Of course, any type of display device may be used capable of displaying information, such as cathode ray tube (CRT), plasma, liquid crystal display (LCD) or projection displays. FIG. 2 further shows a viewer or user 250 of the interaction system 200 looking at the various products 230, 232, 234 and/or the information displayed on the shop window display 240.

The displayed information on the shop window display 240 may be related to the most relevant product or products, as determined from the gaze, such as from the duration of a gaze toward each product. The various gaze intervals or durations associated with a particular product, including gazes at different discontinuous time intervals, may be added to form a cumulative gaze duration for each particular product. The cumulative gaze duration may be determined or accumulated during any desired interval, which may be predetermined, variable and/or programmable.

Figure 3:
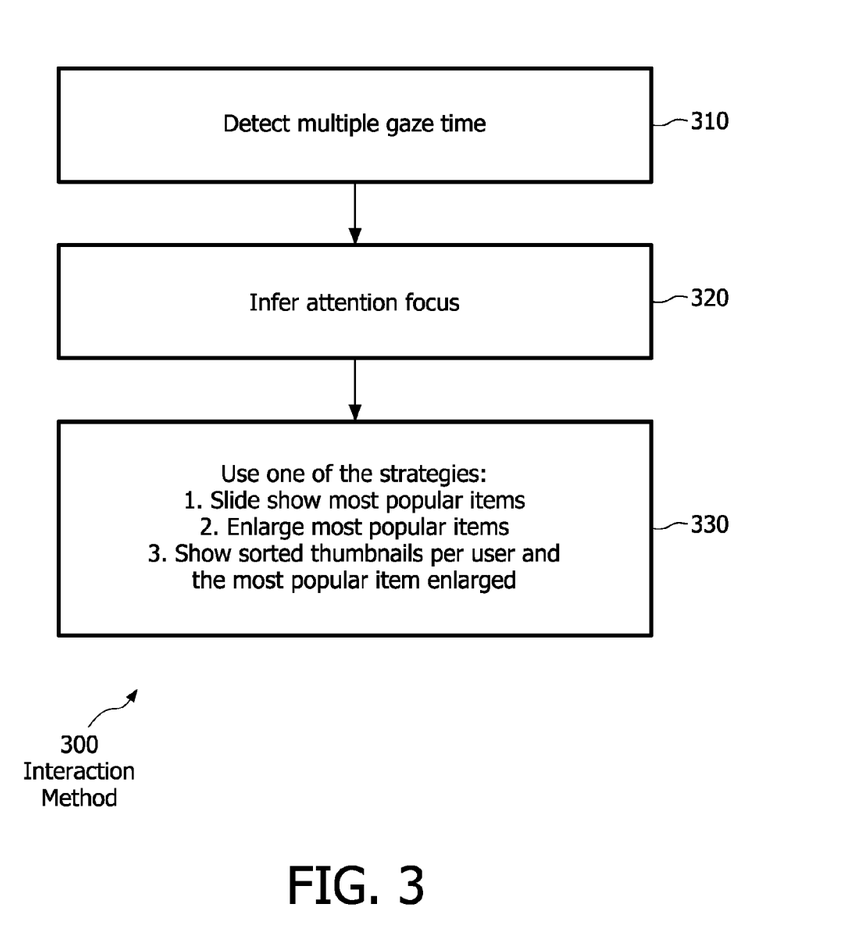
FIG. 3 shows an interaction method according to yet another illustrative embodiment of the present invention.

FIG. 3 shows an interaction method 300 according to one embodiment where, as shown in block 310, the gaze(s) of one or multiple viewers is detected. For clarity, an example using a single viewer will be described, but one skilled in the art would understand that the gaze of multiple users may be tracked to determine the products of interest to the various viewers.

The gaze duration, such as the cumulative durations of gazes during a desired interval is used to indicate or determine the degree of interest of the viewer (and/or multiple viewers) in the various products gazed at, as shown in block 320, where the user's interests are inferred from data provided to or accessible by the processor 130 of FIG. 1.

The products within view and gazed at by the viewer may be ranked in accordance with their corresponding gaze durations of the corresponding products. For example, the products may be ranked from the most relevant product having the largest cumulative gaze duration, to the least relevant product having the smallest cumulative gaze duration. Of course any other ranking may be used, including providing different weight to one or more product, such as based on the relation among the different products, where related products may be grouped and associated with a group weight, where the groups themselves are ranked and weighed, and further divided in sub-groups which also may be ranked and weighed to determine various sets of ordered products for information display and/or highlighting.

For example, table 1 shows gaze durations of various products, including groups and sub-groups of products that are related with their associated weighted durations.

TABLE 1

|  | Gaze Duration (cumulative) | Weighted Product Duration | Weighted Sub-Group Duration |
| --- | --- | --- | --- |
| Group 1 |  |  |  |
| Camera 1 | 29 | 58 |  |
| Camera 2 | 4 | 8 |  |
| Camera 3 | 2 | 4 |  |
| Cumulative Camera | 35 |  | 70 |
| memory 1 | 5 | 10 |  |
| memory 2 | 2 | 4 |  |
| Cumulative memory | 7 |  | 14 |
| Battery 1 | 4 | 8 |  |
| Cumulative Battery | 4 |  | 8 |
| Cumulative Group 1 | 46 |  |  |
| Group 2 |  |  |  |
| Shirt 1 | 7 | 7 |  |
| Shirt 2 | 2 | 2 |  |
| Shirt 3 | 1 | 1 |  |
| Cumulative shirt | 10 |  | 10 |
| Pants 1 | 4 | 4 |  |
| Pants 2 | 3 | 3 |  |
| Cumulative Pants | 7 |  | 7 |
| tie | 1 | 1 |  |

TABLE 1-continued

|  | Gaze Duration (cumulative) | Weighted Product Duration | Weighted Sub-Group Duration |
| --- | --- | --- | --- |
| Cumulative tie | 1 |  | 1 |
| suit | 5 | 5 |  |
| Cumulative suit | 5 |  | 5 |
| Cumulative Group 2 | 23 |  |  |

As shown in Table 1, camera 1 has the highest cumulative gaze duration of 44 units of time, such as seconds, or any other unit, accumulated during a predetermined time, such as 2 minutes for example. Of course, the predetermined time may be any desired, e.g., programmable, time, such as 10 minutes instead of 2 minutes, one hour, etc.

In the example shown in Table 1, during the selectable or programmable predetermined time period such as 2 minutes for example, a viewer gazed at products in Group 1 for 46 seconds and products in Group 2 for seconds 23, which is about half the amount of time gazed at Group 1, thus resulting in a Group 1 weight of 2 and Group 2 weight of 1. The Weighted Product Duration column in Table 1, shows that the camera 1 gaze duration of 29 is multiplied by the Group 1 weight of 2 to result in a weighted camera 1 gaze duration of 58.

In the illustrative ranking scheme shown in Table 1, information related to the Groups may be ranked and/or displayed on the display device 140, for example, based on their cumulative gaze duration. Thus Group 1, having a group cumulative gaze duration of 46 seconds is displayed first, and then Group 2 is displayed or listed having a group cumulative gaze duration of 23 seconds. Within each group, the products may be ranked and/or displayed in the order of their gaze durations. Accordingly, camera 2 is shown second, despite having a cumulative gaze duration of 4 seconds which is less than the cumulative gaze duration of other products, such as the memory 1 with 5 seconds, and the shirt 1 with 7 seconds.

Sub-groups may also be ranked where the sub-group "camera" has the largest sub-group cumulative gaze duration of 35 seconds within Group 1 (as compared to 7 seconds for the memory sub-group, and 4 seconds for the battery sub-group). Accordingly, the sub-group "camera" is ranked higher, and camera 2 with 4 seconds of cumulative gaze duration is displayed before memory 1, despite memory 1 having a larger cumulative gaze duration of 5 seconds.

Any other scheme may be used to rank, list and determine the products that are most relevant to the user based on the duration of gaze of the user at the product, which may be cumulative or non-cumulative, including ranking based on the Weighted Sub-Group Duration shown in the last column of Table 1, where the 35 seconds of the sub-group "camera" is multiplied by 2, the Group 1 weight, to arrive at the weighted sub-group "camera" value of 70 seconds. One skilled in the art in view of the present disclosure may determine various ranking schemes, including assigning various weights to various products or group of products. For example, if a cumulative gaze duration associated with product 1 in Group 2 (having a lower Group Weight than Group 1) is much longer, e.g., longer or larger than a predetermined threshold, which may be absolute or relative to other cumulative gaze durations of other products, then the product 1 in Group 2 may be ranked higher and determined to be the most or more relevant to the user despite having a lower weighted product gaze duration than other weighted product gaze durations in Group 1 for example, (since Group 2 has a lower Group Weight than Group 1).

Similarly, if a single non-cumulative gaze duration associated with a product X is larger than a predetermined threshold, absolute or relative, then this product X may be ranked higher and determined to be the most relevant to the user despite being ranked below other product based on weighted gaze duration, due to lower weight of the group associated with this product X.

Various information may be displayed that are determined to be relevant to the viewer, such as related to the gazed products and their ranking based on gaze durations, average and/or cumulative. For example, during a viewing session, the viewer may gaze at different products including product one, and then return to gaze at product one after gazing at other products. The gaze durations looking at product one at various discontinuous time periods during the entire viewing session of a predetermined duration such as 2 minutes, for example, are summed to arrive at the cumulative gaze duration for product one. This cumulative gaze duration may be normalized or averaged over the predetermined time period, such as by dividing the cumulative gaze duration by the predetermined time period, for example.

Product related information are displayed once the product or products of interest or most relevant to the viewer are determined and ranked based on gaze durations, such as the weighted, averaged, and/or cumulative gaze durations. Information about any number of the most relevant products may be provided or such products highlighted, for example, the top five ranked products.

For displaying information about products or product groups that are most relevant to the user, different strategies may be used, as shown in block 330 of FIG. 2. In particular, any one or more of the following strategies may be used to display various information on the display device 140:

1. starting and showing a slide show or video clip related to one or more of the most looked products; e.g., the product having the largest single and/or cumulative gaze duration;

2. in a display of the top five products of interest for example, enlarging the most looked at product (having the largest single and/or cumulative gaze duration); and/or 3. in a display of a list or representations 260 shown in FIG. 2, such as icons or thumbnails, of the top five products of interest for example, enlarging the most looked at representation(s), where a thumbnail includes a miniature version or picture of the product, or type of product more specific than an icon, such as a Philips™ DVD player/recorder or a picture thereof, for example.

Of course, instead of displaying the relevant product(s) or representation(s) thereof on a display device, the relevant product(s) may be highlighted by the highlighter 150 shown in FIG. 1, such as by illuminating the relevant product(s) with distinguishing lighting, for example. Such a highlighting system where physical products in the shop window are highlighted, e.g., by light illumination using controllable light sources to provide light of desired attributes, such as intensity, color, hue saturation, color temperature, beam width, spot size and/or direction, such as light emitting diodes (LEDs), spot light(s) and a switchable mirror located behind each product, are described in European Patent Application Serial Number 06114760.9, filed May 31, 2006, entitled "Mirror Feedback on Physical Object Selection" which is incorporated herein by reference in its entirety.

Highlighting may also be provided using glowing mats upon which a product is placed, or using strips located around the product, such as the footprint and/or periphery of the product, where the mat and/or strips glow, e.g., by turning on a light source(s) embedded therein, as described in European Patent Application Serial Number 06115086.8, filed Jun. 7, 2006, entitled "Light Feedback on Physical Object Selection" which is incorporated herein by reference in its entirety. When the physical product is highlighted, the intensity of glowing may be related to the associated (cumulative and/or average) gaze time. Thus, the larger the gaze time, the brighter the highlighting of the product gazed at by increasing the intensity of the light source(s) that provides the product highlighting, such as the spot light(s) that illuminates the product and/or the light source(s) that illuminate the mats and/or strips surrounding or near the product.

In the context of the illustrative example of the shop window system 200 shown in FIG. 2, a gaze detector 110 (FIG. 1) is configured to detect the gazes of multiple users in parallel and can operate in varying light conditions, such as a system with one or more cameras 210, 212 of FIG. 2, typically two or three cameras, for head, eyelid and gaze tracking, may be used or other gaze tracking system such as ones available from Smart Eye AB, based in Sweden, where a single camera system has anti-sleep applications for detecting drowsiness of drivers, for example, where multiple cameras may also be used.

The camera(s) work together with an IR-flash illuminators and filters that are tuned to frequencies with minimum interference of outdoor light, for robust operation under various illumination conditions. Such a gaze system tracks facial features and matches them to a three dimensional (3D) head model to estimate the 3D position and orientation of the head. The irises and pupils, as well as the eyelids of the viewer(s) 250 are then detected and localized to determine the viewer's gaze direction.

Other gaze detection systems may be used, such as those referred to as faceLAB™, for example, which are available from Seeing Machines of Australia. Further eye tracking systems that determine the user's line of gaze are described in U.S. Patent Application Publication No. 2004/0196433 to Durnell, entitled "Eye Tracking Systems" which is incorporated herein by reference in its entirety. In yet another system, eye tracking is used to provide control signals, such as for controlling images and other devices, and may be used by pilots as described in U.S. Pat. No. 6,359,601 to Maguire, Jr., entitled "Method and Apparatus for Eye Tracking" which is incorporated herein by reference in its entirety.

The gaze detection system 100 detects an average number of gaze occurrences, such as the average gaze time, for every area associated with exhibited products. To smooth out rapid gaze changes, a sliding window averaging can be used. Using such processing, an average gaze time is obtained for every exhibited product within a specified time frame, such as the last 2 minutes, for example.

To infer the focus of attention, the most looked at products by one or more viewers are identified. The maximum average gaze time corresponds to the most popular product. Other classification methods may also be used, for example k-means clustering with k=2, in order to classify average gaze time for all products in two clusters, "most popular" and "least popular". Further, various weights may be given to various products based on gaze durations by one or more viewers. For example, to assign more weight to products looked at by more then one user, progressive weights >1.0 may be assigned to gaze time averages.

Once the gaze averages have been detected and analyzed, the interaction system 100 of FIG. 1, such as the shop window system 200 of FIG. 2, may deploy one or more strategies for showing relevant information on the shop window display 240, for example, or any other display device, such as displays of mobile devices such as cell phones and/or personal digital assistants (PDA's)

As described, one strategy may be to enlarge the thumbnails 260 of the products identified as "most popular" and to make the thumbnails corresponding to "least popular" products relatively smaller. As a consequence, the system may adapt a visual presentation of the product items, such as slide show, streaming video shows or video clips, to make it easier for the user 250 to find and select, such as click on the product images that were most looked at by the user and displayed on the shop window system 200, using for example a target selection and acquisition system as described in article entitled "Acquisition of Expanding Targets" by McGuffin, M. and Balakrishnan, R., Proc CHI 2002, ACM, 57-64, which is incorporated herein by reference in its entirety. Alternatively, image brightness, opaqueness, and/or color may be changed to make the product thumbnail more apparent on the display device, which thumbnail may additionally or alternately be highlighted on the display device.

Another information conveyance strategy includes automatically starting a slide show or streaming video clips of the products identified as "most popular". The user may then be provided with control, such as software buttons or keys 270 (FIG. 2) displayed on the display device 240 along with the show, to control the show, such as pause the slide show, access and inspect a product sheet of interest. Pointing device may also be used to control displayed items, as is well knows, such as using a pointer or finger on a touch screen or a screen having capacitive touch detectors, which may be provided on the shop window 205, for example, such as touch screens described in UK Patent Application Number GB 2 367 991, to Porter et al., published on Jul. 17, 2002, entitled "Touch Sensitive Display Screen" which is incorporated herein by reference in its entirety. Other input/output devices 160 shown in FIG. 1 may also be used such as a mouse, track ball, keyboard which may include soft keys displayed on a touch screen and the like.

Yet another strategy includes providing an overview of the items "popularity" ordered or ranked per user based on the gaze duration times of the particular user looking at the various products or items. Of course, in this strategy the processor 130 keeps records of the gazes of each user and their durations. If new users arrive, the system will classify them as new users based on face recognition similarity measures well known in the art.

If a gaze tracking for a certain user has been interrupted, due to a user getting outside of the camera(s) view(s), and later the same user returns to the camera's field of view, then tracking of the same user is resumed where the system identifies and classifies the user as an "old" user based on the similarity measure as determined by comparing the returned user's features with a database of recent users.

In one strategy, the system displays an ordered list 252 (FIG. 2) of all items looked at by each user 250 on the shop window display 200. The items are ordered based on their "popularity" according to the user's gaze record. The user then can click on the item's thumbnail 260 displayed on the show window display 240, or any other display device, in order to open or access information about the selected/clicked item(s). Of course, instead of merely providing a list 252 or links 254 of additional information, such information as predetermined by the system administrator may be automatically presented to the user in response to detecting or determined the user's interest in a product(s) based on the gaze duration(s). The system may also be configured to display information related to the most "popular" item 260 associated with one or more users by default anywhere on the display device, such as in the center of the shop window display.

To make the presentation of products more attractive and to create an impression of an organically changing shop window display, special effects may be used, such as fade in and/or fade out effects for product image changes. A delay may be introduced between the gaze detection and adapting or changing the information on the shop window display in response to the gaze detection, since naturally users would most probably first look at products and only after a while glance at the display. Another embodiment includes triggering information change or adaptation on the shop window display as soon as a gaze at the shop window is detected, or even in anticipation of a gaze such as detection of the user shifting his or her gaze in the direction of the shop window. A quick information display will make the responsiveness of the system more evident to users as well as act as an attention grabber, thus persuade user to look or keep looking at the shop window, and interact with the shop window interaction system.

Apart from gaze as an input modality, it is also possible to use spontaneous pointing gestures, and/or touching the shop window which may have capacitive touch detectors to elicit user's focus of interest as described in above discussed European Patent Application Serial Number 05107205.6, filed Aug. 4, 2005, entitled "Apparatus for Monitoring a Person Having an Interest to an Object, and Method Thereof".

Alternatively or in addition, posture orientation may be used to determine which part of the shop window is now attended by the user. Posture orientation may be detected with sensing mats 295 integrated into the pavement in front of the shop window capable of detecting feet orientation. Such mats may include sensors that detect the orientation of the feet or shoes thereon and provide the orientation information to the processor 130. Further, head orientation may be detected with computer vision techniques to detect the direction of gaze, and highlight products or display information related to the products that are in the direction of gaze. Yet another embodiment may use distribution of users along the shop window to detect which groups of products are being currently looked at. For example, if more users are detected, via the cameras 210, 212, for example, near the right side of the shop window as compared to other parts, then products on the right side are determined to be of interest and processed as described, such as highlighting such product(s) or displaying related information.

It should be understood that the interaction systems and methods are applicable in many situations, such as in museums, exhibitions and in general for applications where a combination of physical products and an electronic display is used.

Thus, in addition to products behind the shop window, the interaction systems and methods are equally applicable for large products where specific parts of a product can be "selected" with gaze. For example, a bicycle shown in the shop window may contain a dynamo, a gear, a lock, a seat, etc. Using the described methods, specific parts of the bicycle get most looked at by the user may be identified and subsequently display information about those parts displayed on the shop window, for example.

Of course, as it would be apparent to one skilled in the art of communication in view of the present description, various elements may be included in the system components for communication, such as transmitters, receivers, or transceivers, antennas, modulators, demodulators, converters, duplexers, filters, multiplexers etc. The communication or links among the various system components may be by any means, such as wired or wireless for example. The system elements may be separate or integrated together, such as with the processor.

As is well-known, the processor 130 executes instruction stored in the memory 120, for example, which may also store other data, such as predetermined or programmable settings related to system interaction, thresholds, predetermined sessions intervals, setting for the display of product information and for lights attributes used for highlighting the product(s), etc.

The information displayed on the display device may include products related to the most-looked at product(s) or any other information such as advertisement, promotional material and products as determined by third party or different sources, such as the shop owner, system administrator, advertisers etc. Any information source may be used, whether stored locally or remotely, and/or accessible, pushed and/or pulled through a network, such as the Internet, for example, via the product manufacturer's web site or the like.

It should be understood that the various component of the interaction system may be operationally coupled to each other by any type of link, including wired or wireless link(s), for example. Various modifications may also be provided as recognized by those skilled in the art in view of the description herein. The memory may be any type of device for storing application data as well as other data. The application data and other data are received by the controller or processor for configuring it to perform operation acts in accordance with the present systems and methods.

The operation acts of the present methods are particularly suited to be carried out by a computer software program, such computer software program preferably containing modules corresponding to the individual steps or acts of the methods. Such software can of course be embodied in a computer-readable medium, such as an integrated chip, a peripheral device or memory, such as the memory or other memory coupled to the processor of the controller or light module.

The computer-readable medium and/or memory may be any recordable medium (e.g., RAM, ROM, removable memory, CD-ROM, hard drives, DVD, floppy disks or memory cards) or may be a transmission medium (e.g., a network comprising fiber-optics, the world-wide web, cables, and/or a wireless channel using, for example, time-division multiple access, code-division multiple access, or other wireless communication systems). Any medium known or developed that can store information suitable for use with a computer system may be used as the computer-readable medium and/or memory 120.

Additional memories may also be used. The computer-readable medium, the memory 120, and/or any other memories may be long-term, short-term, or a combination of long- and short-term memories. These memories configure the processor/controller 130 to implement the methods, operational acts, and functions disclosed herein. The memories may be distributed or local and the processor, where additional processors may be provided, may be distributed or singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within memory, for instance, because the processor may retrieve the information from the network.

The processor 130 and the memory 120 may be any type of processor/controller and memory, such as those described in U.S. 2003/0057887, which is incorporated herein by reference in its entirety. The processor may be capable of performing operations in response to detecting user's gazes, and executing instructions stored in the memory. The processor may be an application-specific or general-use integrated circuit(s). Further, the processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit. Each of the above systems utilized for identifying the presence and identity of the user may be utilized in conjunction with further systems.

Of course, it is to be appreciated that any one of the above embodiments or processes may be combined with one or with one or more other embodiments or processes to provide even further improvements in finding and matching users with particular personalities, and providing relevant recommendations.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same or different item(s) or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The invention claimed is:

1. An interaction system comprising:
a detector configured to detect gazes of at least one viewer looking at a plurality of items;
a processor configured to
calculate cumulative gaze durations per item of said plurality of items,
rank each of the plurality of items in accordance with the calculated cumulative gaze durations of each of said plurality of items,
identify a most looked at item in accordance with said ranking,
create at least one group of related products and associate the group with a group weight,
rank each of the groups of related products,
divide each group of related products into sub-groups which are further ranked and weighted to determine sets of ordered products based on the weighted rankings of the sub-groups; and
a display adapted to display a list of said plurality of items and the sets of ordered products according to said ranking and to start at least one of an audio and visual show related to the most looked item according to said ranking.

2. The interaction system of claim 1, wherein said most looked at item is displayed more prominently.

3. The interaction system of claim 1, further comprising a mat configured to detect feet orientation of said at least one viewer.

4. An interaction method comprising:
detecting gaze times within a predefined period for a plurality of products within a view of at least one user;
wherein the plurality of products includes groups of related products,
assigning to each of the groups of related products a group weight;
ranking each of the plurality of products according to the detected gaze times factoring in the group weight associated with each product;
identifying a most looked at product from the ranked products
displaying the plurality of products on a display device according to the ranking; and
starting at least one of an audio and visual show related to the most looked product.

5. The interaction method of claim 4, further comprising:
displaying thumbnails of the most looked at products sorted according to the ranking;
enlarging at least one of said thumbnails corresponding to at least one of the most looked at products associated with at least a highest ranking;
highlighting the most looked at products according to the ranking;
displaying said at least one of the most looked at products more prominently than others of the most looked products on said display device.

6. The interaction method of claim 5, wherein said displaying act displays said at least one of the most looked at products in a predetermined section of said display device, including a center of said display device.

7. The interaction method of claim 4, wherein said ranking comprises positioning each of the plurality of products from a most relevant product having a largest gaze time to a least relevant product having a smallest gaze time.

8. The interaction method of claim 4, further comprising tracking durations of gazes of said at least one user gazing at an individual product of said products within said predefined period to form a gaze time of said gaze times corresponding to said individual product.

9. The interaction method of claim 4, wherein said gaze times include cumulative gaze time per product of said products gazed by said user within said predetermined period.

10. The interaction method of claim 4, wherein said gaze times include cumulative gaze time per product per viewer of said products gazed by multiple viewers within said predetermined period.

11. An interaction method comprising:
tracking gaze durations of gazes of at least one viewer viewing a plurality of products, the gaze durations comprising various gaze intervals or durations associated with each of the plurality of products, including gazes at different discontinuous time intervals;
wherein said plurality of products include groups of related but distinct products and each of the groups are associated with a group weight;
ranking said plurality of products in accordance with said gaze durations wherein said gaze durations for each of said products is factored by said respective group weight;
determining interested products of said at least one viewer in accordance with said ranking;
displaying at least one of said interested products, representations of said interested products, and a list of said interested products including a predetermined number of most looked at products in accordance with ranking; and
highlighting said at least one of said interested products in accordance with said ranking.

12. The interaction method of claim 11, wherein said highlighting act includes at least one of the acts of:
illuminating said at least one of said interested products; and
displaying a representation of said at least one of said interested products more prominently than other representations on a display device.

13. An interaction system, comprising:
a detector operable to detect gazes of at least one viewer looking at a plurality of items;
a processor and associated memory having programming instructions, the processor programmed to
calculate cumulative gaze durations per item of the plurality of items;
rank each of the plurality of items with determined cumulative gaze durations of each of the plurality of items;
identify the item having a ranking indicative of the highest of the calculated cumulative gaze durations;
the system further including
a display configured with the processor to display a list of the plurality of items according to the rankings and to start at least one of an audio and visual presentation related to the identified item having a ranking indicative of the highest of the calculated cumulative gaze durations.

* * * * *